United States Patent
Bryant et al.

(10) Patent No.: US 7,483,384 B2
(45) Date of Patent: Jan. 27, 2009

(54) SYSTEM AND METHOD FOR MONITORING NETWORK TRAFFIC

(75) Inventors: Craig Bryant, Fort Collins, CO (US); James Sampey, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1123 days.

(21) Appl. No.: 10/668,888

(22) Filed: Sep. 22, 2003

(65) Prior Publication Data
US 2005/0063377 A1    Mar. 24, 2005

(51) Int. Cl.
*H04L 12/28* (2006.01)
*H04L 12/56* (2006.01)

(52) U.S. Cl. .................. 370/252; 370/389; 370/419

(58) Field of Classification Search .............. 370/282, 370/389, 252, 237, 238, 419; 709/219; 713/201
See application file for complete search history.

(56) References Cited

U.S. PATENT DOCUMENTS

| 2002/0144156 A1* | 10/2002 | Copeland, III | 713/201 |
| 2004/0151382 A1* | 8/2004 | Stellenberg et al. | 382/219 |
| 2005/0086325 A1* | 4/2005 | Slipp et al. | 709/219 |

* cited by examiner

*Primary Examiner*—John Pezzlo

(57) ABSTRACT

A system includes a packet reader configured to scan packets transmitted through a network for pre-specified criteria. The packets include endpoint information and data. A request/response matcher determines whether each packet meets pre-specified criteria, and matches request packets with corresponding response packets when the packets meet the pre-specified criteria. A message analyzer determines the format, or structure, of the data of the matched packets, and analyzes the data of the matched packets to generate at least a portion of a model of the data.

23 Claims, 4 Drawing Sheets

SYSTEM AND METHOD FOR MONITORING NETWORK TRAFFIC

BACKGROUND OF THE INVENTION

Computer networks use communication protocols to send packets of information. The packet header includes the address of the destination computer. Only the computer with the matching address is supposed to accept the packet. A computer that accepts all packets, including packets addressed to other computers, is said to be in promiscuous mode.

Intercepting packets in transit over a network is referred to as "sniffing." A sniffer is a program or device that monitors and analyzes network traffic, detecting bottlenecks and problems. Using this information, a network manager can keep traffic flowing efficiently. A network router reads every packet of data passed to it, and determines whether it is intended for a destination within the router's own network or whether it should be passed further along the network. A router with a sniffer, however, may be able to read the data in the packet as well as the source and destination addresses.

The popularity of packet sniffing stems from the fact that a sniffer can read everything in the packets. Information that can be sniffed includes e-mail sent via SMTP, POP, IMAP packets; passwords transmitted in POP, IMAP, HTTP, Telnet authentication packets; files send via SMB, NFS, FTP packets; and database information sent via SQL.

Extensible Markup Language (XML) is a common language for network communications. Important electronic content and business documents are increasingly transmitted as XML-encoded messages, which are often accessed by and provide data to application programs on remote servers. Although firewalls have been the mainstay for implementing network security, they are not able to provide security at the application layer because they can only filter at the packet level and do not examine the contents of messages.

Traditional firewalls protect a network's perimeter by blocking incoming traffic using several different means. Some block all TCP ports except for port 80 (HTTP traffic); port 443 (HTTPS traffic); and port 25 (email traffic). Some ban traffic from specific IP addresses, or ban traffic based on the traffic's usage characteristics. The problem with these firewalls when it comes to XML traffic, is that many packets containing information in XML are transmitted to port 80.

XML allows developers to define new programming languages and formats. XML separates structure and content from presentation. Thus, a single XML source document can be written once, and displayed using a variety of digital devices, such as a computer monitor, a cellular-phone display, and so forth. XML has been optimized for delivery information over networks such as the World Wide Web. XML defines a family of standards for all aspects of information presentation, including markup, linking, style, structure, and metadata.

XML describes a class of data objects called XML documents. XML documents comprise storage units called entities. An XML document may consist of one or many entities. Each XML document has at least one entity called the document entity, which serves as the starting point for the XML processor and may contain the entire document.

XML documents typically begin with an XML declaration that specifies the version of XML being used. For example, the statement <?xml version="1.0"?> at the beginning of an XML document indicates that the statements in the document conforms to Version 1.0 of XML. Text in XML documents consists of intermingled character data and markup. Markup takes the form of start-tags, end-tags, empty-element tags, entity references, character references, comments, character data (CDATA) section delimiters, document type declarations, processing instructions, XML declarations, and text declarations.

Each XML document contains one or more elements, the boundaries of which are either delimited by start-tags and end-tags, or, for empty elements, by an empty-element tag. The beginning of every non-empty XML element is marked by a start-tag "<element>". The end of every element that begins with a start-tag must be marked by an end-tag "</element_name content>" containing the element's name as given in the start-tag. A monomer XML element can be structured as <elementname/>. The text between the start-tag and end-tag is called the element's content. Each element has a type, identified by name, and may have a set of attribute specifications. Each attribute specification can have a name and a value.

XML allows developers to impose constraints on the storage layout and logical structure of entities. The XML Schema definition language (XSD) provides a type system for XML processing environments. XML Schema also enables developers to define their own types, which are typically referred to as user-defined types (UDTs). An XML document that conforms to an XML Schema type is often referred to as an instance document. XML Schema also provides a repertoire of built-in datatypes that developers can use to constrain text.

A Document Type Definition (DTD) is a set of syntax rules for tags, and is a precursor to the XSD. A DTD specifies the tags that can be used in a document, the order the tags should appear in, which tags can appear inside other tags, which tags have attributes, and so on. A DTD can be part of an XML document, but it is usually a separate document or series of documents.

Hypertext Transfer Protocol (HTTP) is commonly utilized in distributed networks to allow a client to send multiple requests without waiting for responses from server. The HTTP header fields can be categorized as "general", "request", "response", and "entity" fields. The entity fields are applicable to both request and response messages. The following lists provide examples of information that may be available in the HTTP header fields:

General Header Fields
Connection allows the sender to specify options that are desired for that particular connection and must not be communicated by proxies over further connections.
Date field represents the date and time at which the message was originated.
Pragma field is used to include implementation-specific directives that might apply to any recipient along the request/response chain.
Transfer-Encoding field indicates what (if any) type of transformation has been applied to the message body in order to transfer it between the sender and the recipient.
Via field is used by gateways and proxies to indicate the intermediate protocols and recipients between the user agent and the server on requests, and between the origin server and the client on responses.
Entity Fields
Content-Encoding field is used as a modifier to the media-type. When present, its value indicates what additional content codings have been applied to the entity-body, and thus what decoding mechanisms must be applied in order to obtain the media-type referenced by the Content-Type header field. Content-Encoding is primarily used to allow a document to be compressed without losing the identity of its underlying media type.

Content-Language field describes the natural language(s) of the intended audience for the enclosed entity. Note that this might not be equivalent to all the languages used within the entity-body.

Content-Length field indicates the size of the entity-body, in decimal number of OCTETs, sent to the recipient or, in the case of the HEAD method, the size of the entity-body that would have been sent had the request been a GET.

Content-Location field may be used to supply the resource location for the entity enclosed in the message when that entity is accessible from a location separate from the requested resource's (Universal Resource Identifier) URI.

Content-Type field indicates the media type of the entity-body sent to the recipient.

Expires field provides the date/time after which the response is considered stale.

Response Header Fields

The first line of the server's response contains a status code. In addition to the status code, the response header may include:

Date field provides the response time (in GMT).

ETag field provides the current value of the entity tag for the requested variant.

Expires prevents caching beyond the given date.

Location field is used to redirect the recipient to a location other than the Request-URI for completion of the request or identification of a new resource.

Proxy-Authenticate field is included as part of a Proxy Authentication Required response. The field value consists of a challenge that indicates the authentication scheme and parameters applicable to the proxy for the Request-URI.

Server field contains information about the software used by the origin server to handle the request. The field can contain multiple product tokens and comments identifying the server and any significant subproducts.

WWW-Authenticate field is included in Unauthorized response messages.

Request Header Fields

Accept field can be used to specify certain media types which are acceptable for the response. Other Accept fields can indicate character set, encoding, language, and other acceptable formats for the response.

Age field conveys the sender's estimate of the amount of time since the response (or its revalidation) was generated at the origin server.

Authorization field contains the authentication information of the user agent for the realm of the resource being requested.

Expect field is used to indicate that particular server behaviors are required by the client.

From field, if provided, contains an e-mail address for the human user who controls the requesting user agent.

Host field specifies the Internet host and port number of the resource being requested, as obtained from the original URI given by the user or referring resource.

Proxy-Authorization field allows the client to identify itself (or its user) to a proxy which requires authentication. The Proxy-Authorization field value consists of credentials containing the authentication information of the user agent for the proxy and/or realm of the resource being requested.

Referrer field allows the client to specify, for the server's benefit, the address (URI) of the resource from which the Request-URI was obtained (the "referrer"). The Referrer field allows a server to generate lists of back-links to resources for interest, logging, optimized caching, etc. It also allows obsolete or mistyped links to be traced for maintenance.

TE field indicates what extension transfer-codings it is willing to accept in the response and whether or not the requestor is willing to accept trailer fields in a chunked transfer-coding.

User-Agent field contains information about the user agent originating the request. This information can be used for statistical purposes, tracing protocol violations, and automatically recognizing user agents to tailor responses to avoid particular user agent limitations.

Simple Object Access Protocol (SOAP) is a lightweight XML based protocol for exchange of information in a decentralized, distributed environment. SOAP consists of three parts: an envelope that defines a framework for describing what is in a message and how to process it, a set of encoding rules for expressing instances of application-defined datatypes, and a convention for representing remote procedure calls and responses. SOAP can potentially be used in combination with a variety of other protocols including HTTP and HTTP Extension Framework. SOAP follows the HTTP request/response message model providing SOAP request parameters in a HTTP request and SOAP response parameters in a HTTP response.

SUMMARY

According to some embodiments, a monitor system includes a packet reader configured to scan packets transmitted through a network for pre-specified criteria. The packets include endpoint information and data. A request/response matcher receives packets that meet the pre-specified criteria, and matches request packets with corresponding response packets. A message analyzer accesses the matched packets, determines the structure of the data of the matched packets, and generates at least a portion of a model of the data.

In other embodiments, a method for monitoring network traffic includes intercepting packets prior to delivering the packets to their destination. The method further determines whether the packets match a pre-defined format; and matches request and response packets among the packets that match the pre-defined format.

In still other embodiments, an apparatus intercepts packets prior to delivering the packets to their destination. The apparatus determines whether the packets match a pre-defined criteria, and generates at least a portion of a model for data in the packets that match the pre-defined criteria.

BRIEF DESCRIPTION OF THE DRAWINGS

Embodiments of the invention relating to both structure and method of operation, may best be understood by referring to the following description and accompanying drawings.

DETAILED DESCRIPTION

What is desired is a system capable of monitoring packets in a network that are formatted according to a specified criteria, such as XML. Further, the system can match related incoming and outgoing messages; generate at least a portion of a data model for the related messages; determine the type of applications programs in which the messages are utilized; map traffic patterns between components in a network; and provide information from the messages to other components in the network that may be interested in the information. A map of the data models and the endpoints that transmit packets conforming to each data model can also be generated and provided to the interested components. The information in the map can be used by the interested components to communicate with the endpoints. The system can also be configured to protect networks against the unique dangers and intrusions posed by particular types of content. For example, such a system can examine SOAP headers and XML tags, and based on the contents in messages, distinguish legitimate from unauthorized content.

Figure 1:
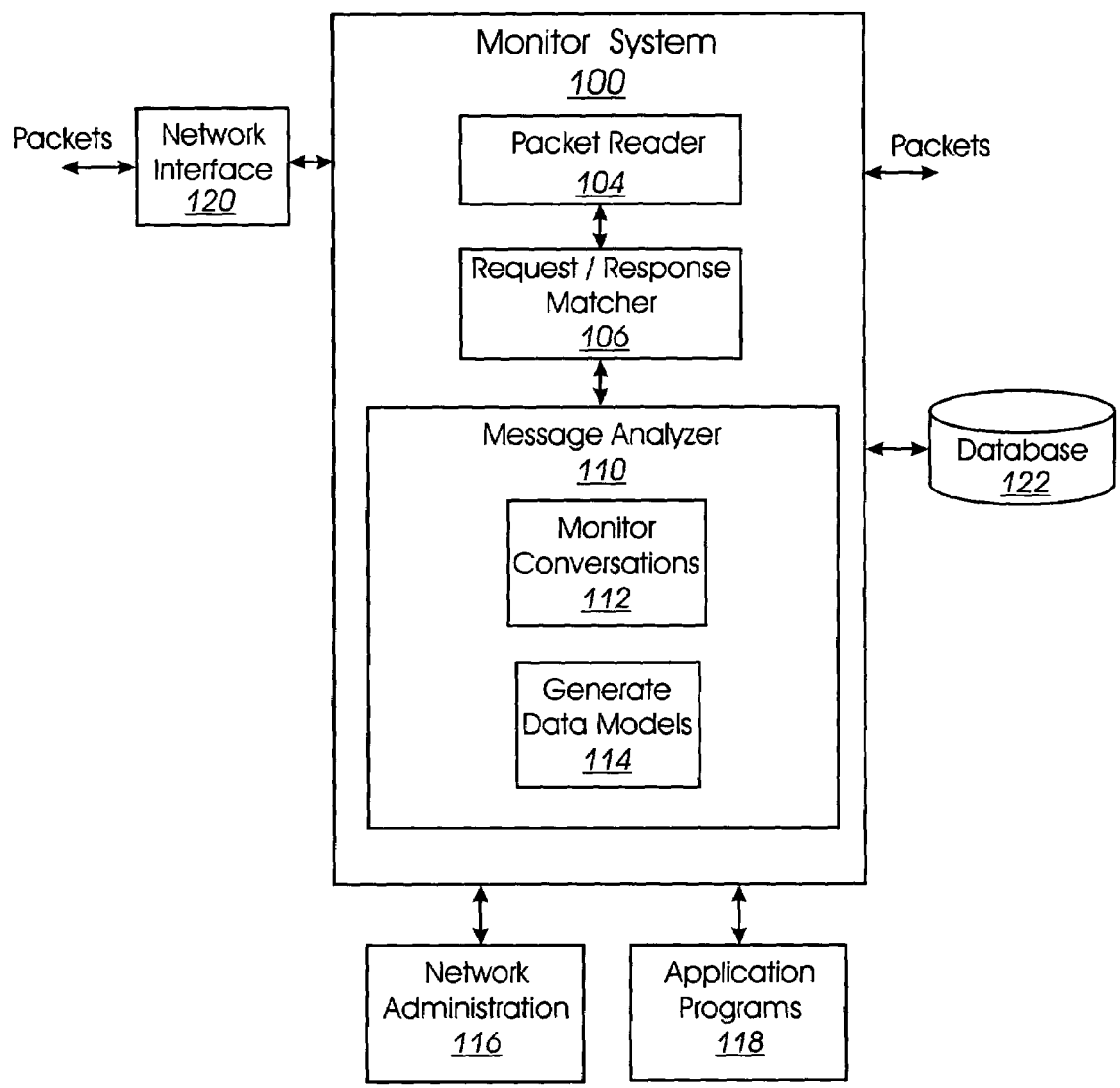
FIG. 1 is a block diagram of an embodiment of a monitor system.

Referring to FIG. 1, an embodiment of monitor system 100 is shown that includes packet reader 104, request/response matcher 106, and message analyzer 110. Message analyzer 110 can invoke monitor conversations function 112, generate data models function 114, and other functions that can monitor and analyze packets in a network, determine uses for information contained in various types of packets, and provide the information to functions such network administration 116 and application programs 118.

In some embodiments, packet reader 104 monitors network interface 120, reads pre-specified types of data packets, such as Transport Control Protocol (TCP) and User Datagram Protocol (UDP) packets. Packet reader 104 forwards packets that meet the specified criteria to request/response matcher 106 along with header information regarding the sender or receiver, also referred to as the endpoint, from one or more headers of the packet. Information regarding the endpoint typically includes at least a unique identifier for the network address of the sender or receiver, and the port number over which the package was sent. Some packets include only a portion of the data transmitted by the sender to the receiver. Packet reader 104 forwards all packets that meet the specified criteria to request/response matcher 106. In some embodiments, a copy of the packets is retained by monitor system 100. In other embodiments, the packets that meet the specified criteria are intercepted and prevented from being transmitted to their destination until the packets have been analyzed and authorized for further transmission.

Request/response matcher 106 matches packets associated with the same set of data from packet reader 104 and combines the data from the packets into request/response or publish messages. Once a complete message is formed, request/response matcher 106 forwards the message with the endpoint information to message analyzer 110. Message analyzer 110 determines the type of data that comprises the message. When the data in the message corresponds to a specified criteria, the message and the endpoint information can be sent to database 122 for later analysis. If the data in the message do not correspond to the specified criteria, then message analyzer 110 transmits a signal to inform request/response matcher 106 and packet reader 104 to discontinue monitoring the connection associated with the endpoints of the message.

A growing amount of information passed over networks, such as the Internet, is in the form of Extensible Markup Language (XML) document transmitted via protocols such as TCP/IP, HTTP, and SOAP. Although monitor system 100 can be implemented for use with messages that include information formatted according to various criteria and transmitted through a network via various communication protocols, the examples discussed herein pertain to messages that include all or part of an XML document transmitted via TCP/IP, HTTP and/or SOAP.

Embodiments of monitor system 100 can therefore scan the contents of packets to determine whether they include information formatted according to one of the XML standards. Monitor system 100 can also determine the application program to which the message is being delivered or sent using header information in the packet.

Message headers may include detailed information specifically for monitor system 100 to examine, and if so, monitor system 100 can take an action based on that information. Even if the header does not have this information, however, monitor system 100 can still take actions based on the contents of the header. An HTTP header, for example, might have information about the recipients of the message, about security of the overall message, or about the intermediaries through which the message has passed.

In addition, generate data models function 114 can examine the tags in the body of the message, as well as information regarding the entities, elements, and attributes in the message to determine at least a portion of a data model for the content of the messages. For example, data models for related XML documents are referred to as schemas. At least a portion of a schema for related XML documents can be developed by analyzing element tags, attributes and other components in the XML documents being communicated between a particular client and one or more servers. The data model can be further developed, based on the accumulation of information as additional related packets are analyzed. The data model can provide information that allows a network administrator, application program, or other entity to communicate with the network endpoints.

Monitor system 100 can examine header information to determine whether the message is authorized, or sent by an authorized agent. If a federated identification system is involved, it can examine the SAML (Secure Assertion Markup Language) security token, determine whether to trust the token's creator, and then take action. For example, monitor system 100 can block the message, send the message to a secure environment where it can be further examined, or allow it to pass through.

Monitor system 100 can provide other methods of protection as well. Monitor system 100 can understand and gather information about a requestor and a responder, such as understanding what role the requester plays in the current request, for example. Monitor system 100 can also provide authentication, decryption, and real-time monitoring and reporting.

Figure 2A:
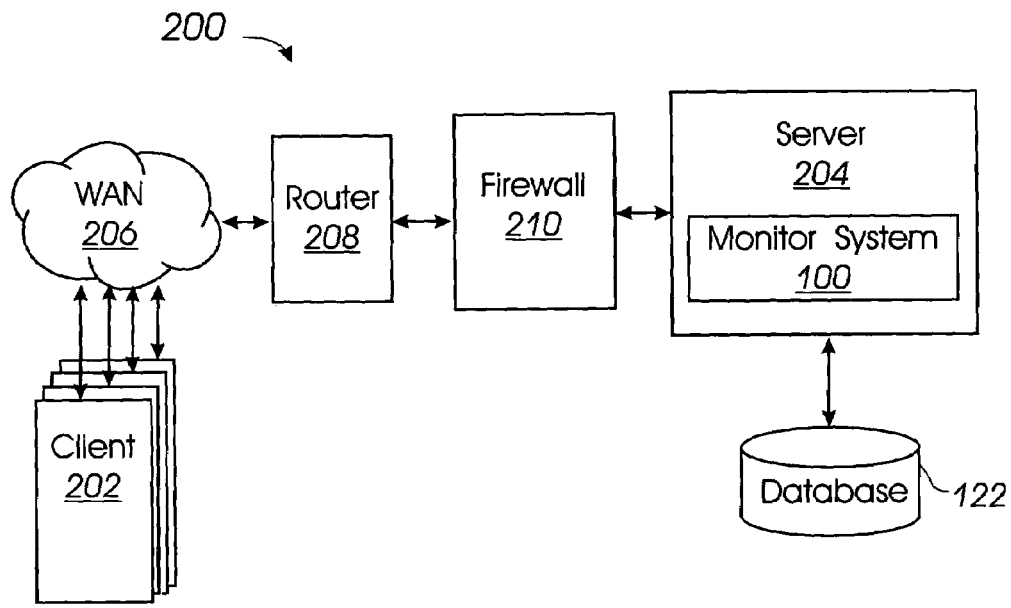
FIG. 2A is a block diagram of an example of a network in which embodiments of the monitor system of FIG. 1 can be utilized.

Referring to FIG. 2A, an embodiment of an information network 200 in which monitor system 100 can be utilized is shown. Network 200 includes a client computer 202 with a central processing unit and a set of input/output devices (e.g., keyboard, mouse, monitor, display, printer, and the like) connected by a system bus. A memory is also connected to the system bus. The memory stores client application programs, such as a web browser. A network interface circuit is also connected to the system bus and to a transmission channel, which may be any wire, wireless, or optical channel to communicate with server 204 via wide area network (WAN) 206.

Client 202 issues a request to server 204 via wide area network 206. One example of a wide area network 206 is the World Wide Web, although monitor system 100 can be utilized in other networks. Communication protocol headers are added to the request before being transmitted from client 202 to create a packet, such as a TCP packet. The packet is routed from client 202 to server 204 via WAN 206, router 208, and firewall 210. Server 204 responds with one or more packets that include the requested information, or other appropriate response, such as indicating that the request could not be fulfilled, for example.

Figure 2B:
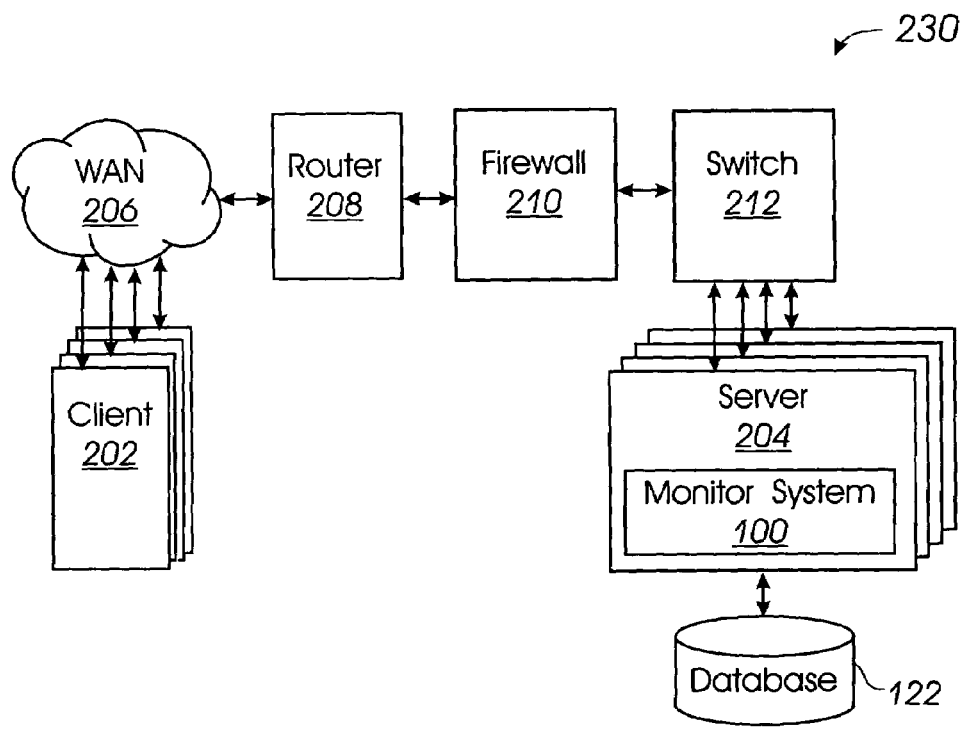
FIG. 2B is a block diagram of an example of a network in which embodiments of the monitor system of FIG. 1 can be utilized.
Figure 2C:
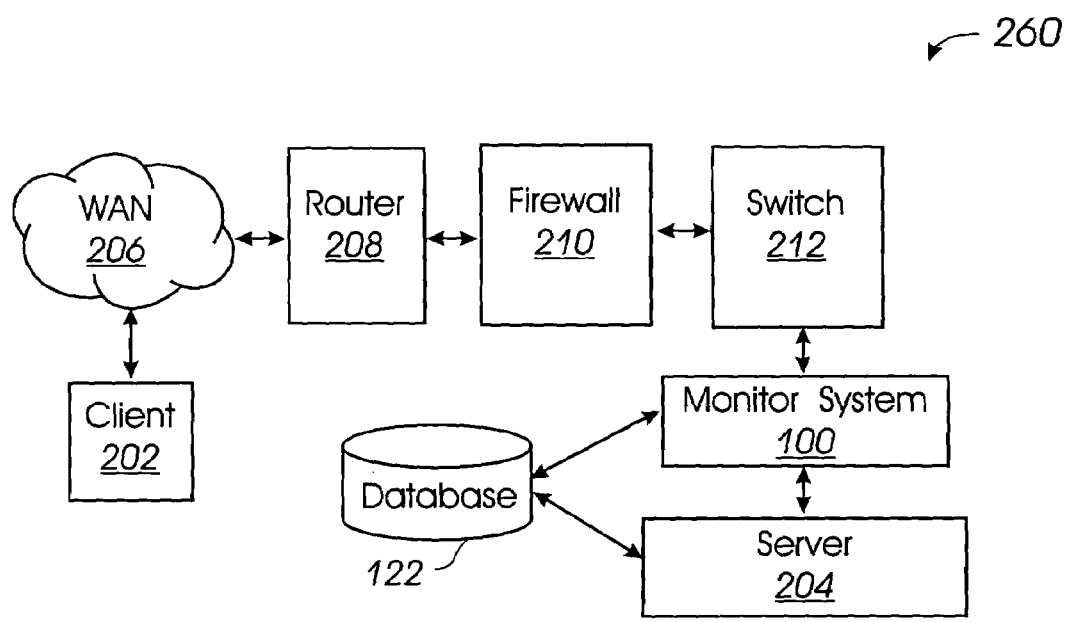
FIG. 2C is a block diagram of an example of a network in which embodiments of the monitor system of FIG. 1 can be utilized.

Referring to FIGS. 2A through 2C, embodiments of information networks 200, 230, 260 are shown including one or more client computers 202 and server computers 204. Switch 212 is included as shown in network 230 (FIG. 2B) to handle messages for one or more of servers 204 at a particular logical location while sharing resources such as firewall 210 and router 208. Another switch 212 can also be included to handle messages destined for one or more of clients 202 at a particular logical location.

Monitor system 100 can be implemented internal to server 204, as shown in FIGS. 2A and 2B, or external to server 204, as shown in FIG. 2C. Monitor system 100 can include facilities for direct access to database 122.

Components included in networks 200, 230, 260 are typically implemented in suitable computer-processing devices that include memory for storing and executing logic instructions, and are capable of interfacing with other processing systems. In some embodiments, components in networks 200, 230, 260 can communicate with each other and with other external networks via suitable interface links such as any one or combination of T1, ISDN, cable line, a wireless connection through a cellular or satellite network, or a local data transport system such as Ethernet or token ring over a local area network.

Various input/output devices, such as a keyboard and mouse (not shown), can be included to allow a user to interact with components internal and external to networks 200, 230, 260. Additionally, processing systems for networks 200, 230, 260 can be embodied in any suitable computing device, and so include personal data assistants (PDAs), telephones with display areas, network appliances, desktops, laptops, X-window terminals, or other such computing devices.

Logic instructions can be stored on a computer readable medium, or accessed in the form of electronic signals. The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

Figure 3:
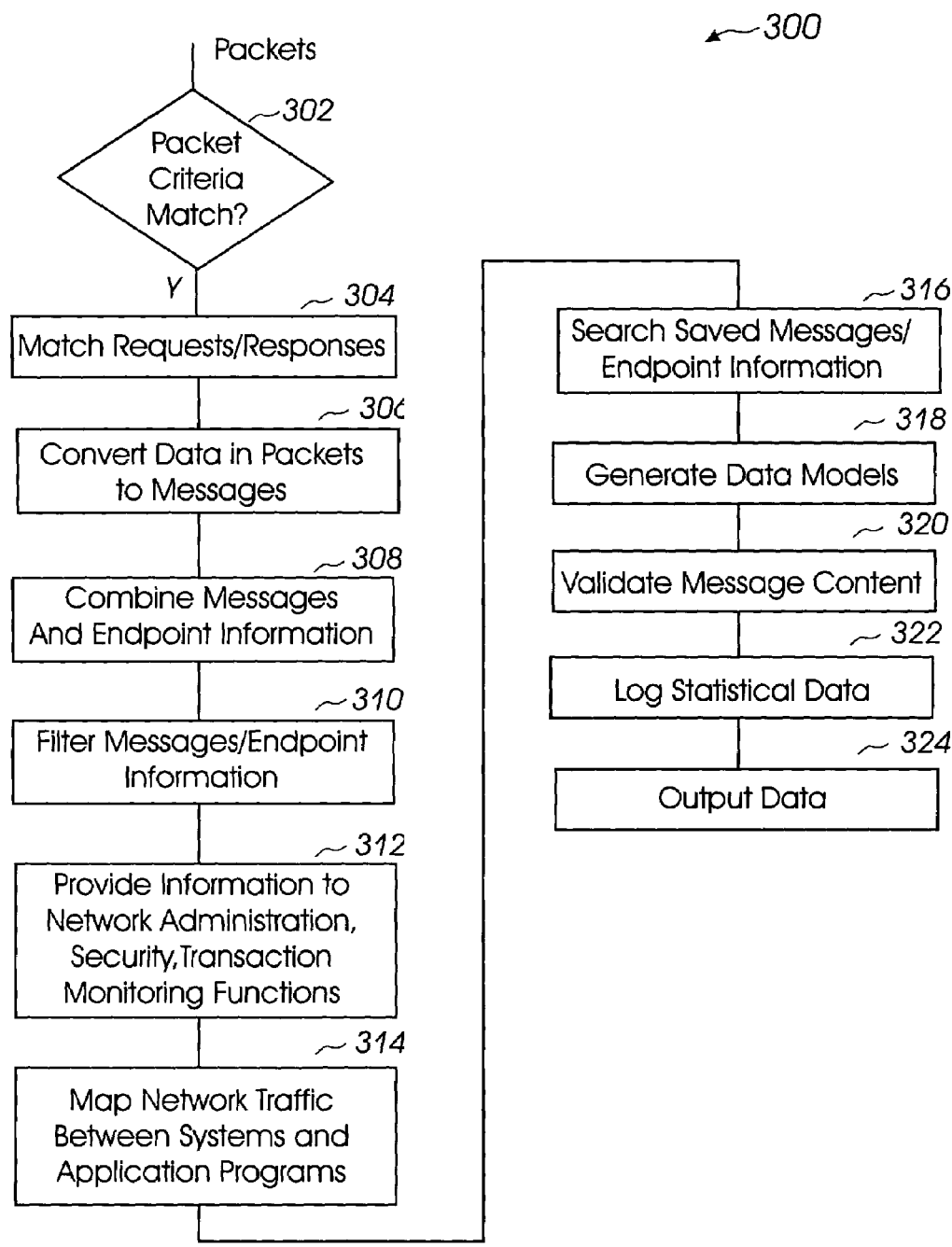
FIG. 3 is an embodiment of a flowchart of functions that can be performed by the monitor system of FIG. 1.

Referring to FIG. 3, an embodiment of a flowchart of functions 300 that can be performed by monitor system 100 is shown. Process 302 scans each packet to determine whether the header or data in the packet meets a pre-specified criteria. For example, process 302 can search for packets that include the XML tag in the data, or a content field in the header indicating that the data has a particular format. Process 302 can include facilities to decrypt, decompress, and process the contents of the packets as necessary to decipher the headers and/or data.

If the criteria established for process 302 is met, the packet is forwarded to process 304 to match request packets with corresponding response packets. The contents of the packets can be sent in original format, or in a converted format generated by process 302 to decipher the contents of the packet. Process 304 can scan information in the header of response packets, such as the Connection and Via fields, to match the corresponding request packets. The header information from the communication protocols can also be used to determine the number and sequencing of packets associated with a response or request message. Once process 304 assembles the packets associated with a particular message, process 306 can extract the data form the packets in the proper order to form the message. The completed message pairs and the corresponding header and endpoint information can be stored for use by other processes in monitor system 100.

Process 310 can filter the messages and header/endpoint information according to one or more filter criteria, such as the port number, the length of the messages, the identities of the senders and recipients, and authorization information. The filtered messages can be provided for use by authorized application programs that perform various functions, such as network administration, network security, and transaction monitoring, as indicated by process 312. The knowledge of the messages and endpoint information can be also used to protect against malicious attacks, such as password dictionary attacks or denial-of-service attacks.

Process 314 maps the traffic patterns between components in a network. The maps can show the amount of traffic flowing between servers and clients, between the application programs that are available at the clients and servers, as well as the types of activities that are being conducted at the clients and servers. For example, process 314 can include logic to determine the type of application that is sending or receiving information, and whether the information is considered sensitive within an organization. If so, then an administrator can take steps to notify the user of violations and/or implement stricter security controls on the sensitive information. Additionally, process 316 can search the stored messages according to various criteria, according to the intended use of the information in the messages and endpoints.

Process 318 can analyze associated messages to determine at least a portion of the data model for the content of the messages. For example, at least a portion of a schema for XML documents can be developed by analyzing element tags, attributes and other components in the XML documents being communicated between a particular client and one or more servers. The schema can be further developed, based on the accumulation of information as additional related packets are analyzed. The generated schema can be used to validate the elements and attributes in future packets to validate the content of the messages, as indicated by process 320.

From the data model developed in process 318, process 312 can determine other servers and application programs that may be interested in particular types of information. For example, if the XML messages being exchanged involve notification of problems with an application program, this information can be provided to an application-monitoring product, such as the OpenView Operations product provided by Hewlett-Packard Corporation of Palo Alto, Calif., to determine the health of the application exchanging XML documents, and/or the hardware on which the application program is operating. The XML schema can provide information that allows a network administrator, application program, or other entity to communicate with the network endpoints.

Existing network infrastructure may authenticate and authorize a request whose contents have been decrypted and whose signatures have been validated. Monitor system 100 can provide another critical aspect of application security including validating the correctness of the request for both semantics and syntax. Checking both semantics and syntax can be important because intermediate nodes in a communication channel are typically not controlled by either party. Further, the same party typically does not control both endpoints. Accordingly, no message, even one that is from a trusted identity, can be assumed to be correct; there is always the possibility the message is from a malicious individual within the trusted partner organization.

Process 322 logs each message and reports on the sender, receiver, time, status, and other parameters associated with the messages and endpoints. A table associating network endpoints with the data models generated in process 318 that can be used to represent data flowing into or out of the endpoints can also be developed. The statistical information, messages, endpoint/data model tables, traffic patterns for related messages in the network, and endpoint information can be accessed via output data process 324. The output can be filtered and presented, such as on a color-coded monitor, according to various filter criteria set by the viewer. Data can also be output to other suitable devices such as printers, disk drives, and portable storage devices. Authorization facilities for accessing the data can be implemented as part of process 324.

Since monitor system 100 can be used in combination with network firewalls 210 (FIG. 2A), monitor system 100 does not need to replicate the protections that are already provided by existing network infrastructure. Monitor system 100 can, however, use detailed knowledge of the specific profiles of individual operations and requestors to implement protections that cannot be enforced by a network level infrastructure. For example, monitor system 100 can confirm the identity of the entity (person, program, organization) making a request. Monitor system 100 can recognize the level of access to which that requestor is entitled. Methods used to authenticate an identity may include: checking a username and password with an lightweight data access protocol (LDAP) directory; confirming the identity of a certificate or digital signature with a PKI; and checking a SAML ticket that was generated by a single-sign on tool.

Monitor system 100 can off-load processing packets that meet specified criteria, such as XML messages, from general purpose servers 204 (FIG. 2A) onto dedicated hardware. While the applications and business processes remain on server 204, monitor system 100 can handle the transport, acceleration and security functions. These solutions can take many forms: low-end switches, intelligent routers and even special purpose-built devices that combine acceleration, security and other functions. Monitor system 100 can be configured to provide wire-speed acceleration, enhanced security, and intelligent router management features to introduce new security measures at a granular bit level, including message-level security, routing and validation, without a significant impact on performance.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed is:

1. A monitor system comprising:
   a packet reader configured to scan packets transmitted through a network for pre-specified criteria, wherein the packets include endpoint information and data;
   a request/response matcher configured to receive packets that meet the pre-specified criteria from the packet reader, and to match request packets with corresponding response packets;
   a message analyzer configured to access the matched packets, determine the structure utilized in the data of the matched packets, and to analyze the data of the matched packets to generate at least a portion of a model of the data; and.
   computer executable instructions on computer readable storage media configured to cause a computer to log statistical information regarding the matched packets.

2. The monitor system according to claim 1 wherein the request/response matcher and the message analyzer are configured to access a database to store and retrieve the matched packets.

3. The monitor system according to claim 1 wherein the packet reader is configured to decipher and reformat the header and data in the packets.

4. The monitor system according to claim 1 further comprising:
   computer executable instructions on computer readable storage media configured to cause a computer to monitor transactions between components in the network based on the matched packets.

5. The monitor system according to claim 1 further comprising:
   computer executable instructions on computer readable storage media configured to cause a computer to provide information regarding the matched packets to an application program in the network.

6. The monitor system according to claim 1 further comprising:
   computer executable instructions on computer readable storage media configured to cause a computer to provide information regarding the matched packets to a network administration facility for the network.

7. The monitor system according to claim 1 further comprising:
   computer executable instructions on computer readable storage media configured to cause a computer to validate the data in subsequent packets based on the data model.

8. The monitor system according to claim 1 wherein the monitor system is implemented within a server in the network.

9. The monitor system according to claim 1 wherein the monitor system is configured to monitor the packets for a plurality of servers in the network.

10. The monitor system according to claim 1 further comprising:
    computer executable instructions on computer readable storage media configured to cause a computer to combine the data from a plurality of related packages to form a message.

11. A method for monitoring network traffic comprising:
    intercepting packets prior to delivering the packets to their destination;
    determining whether the packets match a pre-defined format;

matching request and response packets among the packets that match the pre-defined format; and logging statistical information regarding the matched packets.

12. The method according to claim 11, wherein the packets include headers with endpoint information, and data, the method further comprising:

combining the data from a plurality of related packages to form a message.

13. The method according to claim 12, further comprising:

determining the content of the message.

14. The method according to claim 11, wherein the packets include headers with endpoint information and data, further comprising:

determining traffic flow of the packets in the network based on the endpoint information.

15. The method according to claim 11, further comprising:

generating at least a portion of a data model based on information in related packets.

16. The method according to claim 15, wherein the packets include headers with endpoint information and data, further comprising:

generating a map of the packets transmitted between the endpoints in the network; and providing the data model to other components to enable the other components to communicate with the endpoints.

17. The method according to claim 15, further comprising:

analyzing the data model for information regarding the security of the message; and preventing messages that include confidential information from being transmitted to their destination.

18. The method according to claim 16, further comprising:

preventing unvalidated messages from being transmitted to their destination.

19. An apparatus comprising:

means for intercepting packets prior to delivering the packets to their destination, wherein the packets include headers with endpoint information, and data;

means for determining whether the packets match a pre-defined criteria; and means for generating at least a portion of a data model for the data in the packets that match the pre-defined criteria.

20. The apparatus according to claim 19, further comprising:

means for matching request and response packets among the packets that match the pre-defined criteria; and means for mapping traffic flow between components in a network based on the endpoint information and the data model.

21. The apparatus according to claim 19, further comprising:

means for combining the data from a plurality of related packages that meet the pre-defined criteria to form a message;

means for validating the message based on the data model; and means for preventing unvalidated messages from being transmitted to their destination.

22. The apparatus according to claim 19, further comprising:

means for generating a table of the data model and endpoints that transmit packets that conform to the data model.

23. The apparatus according to claim 21, further comprising:

means for analyzing the data model for information regarding the security of the message; and means for preventing messages that include confidential information from being transmitted to their destination.

* * * * *

UNITED STATES PATENT AND TRADEMARK OFFICE
CERTIFICATE OF CORRECTION

PATENT NO. : 7,483,384 B2 Page 1 of 1
APPLICATION NO. : 10/668888
DATED : January 27, 2009
INVENTOR(S) : Craig Bryant et al.

It is certified that error appears in the above-identified patent and that said Letters Patent is hereby corrected as shown below:

In column 10, line 16, in Claim 1, after "and" delete "."

Signed and Sealed this

Fourth Day of August, 2009

JOHN DOLL
*Acting Director of the United States Patent and Trademark Office*